United States Patent
Ramanathan et al.

(10) Patent No.: US 7,346,627 B2
(45) Date of Patent: Mar. 18, 2008

(54) APPROACHES FOR MIGRATING PORTAL OBJECTS FROM A SOURCE INSTALLATION TO A TARGET INSTALLATION

(75) Inventors: Ravishankar Ramanathan, Richmond, VA (US); Arun Shivaswamy, Bangalore (IN); Balakrishnan Jagdeesan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 574 days.

(21) Appl. No.: 10/789,838

(22) Filed: Feb. 26, 2004

(65) Prior Publication Data

US 2005/0010919 A1   Jan. 13, 2005

Related U.S. Application Data

(60) Provisional application No. 60/482,910, filed on Jun. 25, 2003.

(51) Int. Cl.
*G06F 17/30* (2006.01)

(52) U.S. Cl. .............. 707/103 R; 707/3; 707/104.1; 707/102

(58) Field of Classification Search ............. 707/103, 707/104, 203, 204, 103 R, 104.1, 3, 102
See application file for complete search history.

(56) References Cited

U.S. PATENT DOCUMENTS

| | | | |
|---|---|---|---|
| 6,151,608 A * | 11/2000 | Abrams | 707/204 |
| 6,324,690 B1 | 11/2001 | Luu | |
| 6,643,652 B2 | 11/2003 | Helgeson et al. | |
| 6,915,287 B1 * | 7/2005 | Felsted et al. | 707/1 |
| 6,981,117 B2 * | 12/2005 | Patel et al. | 711/163 |
| 7,062,541 B1 * | 6/2006 | Cannon et al. | 709/219 |
| 7,096,231 B2 * | 8/2006 | Rajak et al. | 707/103 R |
| 7,107,272 B1 * | 9/2006 | Milligan et al. | 707/10 |
| 7,136,872 B2 * | 11/2006 | Krishnamurthy et al. | 707/104.1 |
| 2004/0153459 A1 * | 8/2004 | Whitten et al. | 707/10 |

OTHER PUBLICATIONS

Oracle, "Exporting and Importing Content," http://portalcenter.oracle.com/pls/ops/docs/FOLDER/COMMUNITY/DOCTEAM/DOCINSTCONF/9026_CG_IMEX.PDF, Mar. 18, 2004.

Oracle, "Frequently Asked Questions (FAQ) for Protal 9.0.2.6 Export/Import," http://portalstudio.oracle.com/pls/ops/docs/FOLDER/COMMUNITY/OTN_CONTENT/MAINPAGE/DEPLOY_PERFORM/9026_EXPORT_IMPORT_FAQ_0308.HTM, Mar. 5, 2004.

Oracle, "Oracle9iAS Portal Release Notes Release 2(9.0.2) Section 4 Exporting/Importing Issues and Workarounds" http://portalcenter.oracle.com/pls/ops/docs/FOLDER/COMMUNITY/PORTALRELEASENOTES/HTML/ch4.htm#1005611, May 2002.

* cited by examiner

*Primary Examiner*—Tim Vo
*Assistant Examiner*—Dangelino Gortayo
(74) *Attorney, Agent, or Firm*—Hickman Palermo Truong & Becker LLP (57) ABSTRACT

Approaches for migrating portal objects from a source installation to a target installation are disclosed. In one embodiment, when portal objects are selected to be migrated from a source installation to a target installation, the selected portal objects can be considered to form a transport set. The metadata of the transport set itself may be stored in infrastructure tables. Then the data in the transport tables (i.e. all the application specific data), plus the metadata in the infrastructure tables (about the transport set itself) are exported and/or imported to the target installation. In an embodiment, scripts are generated to perform export and/or import functions.

20 Claims, 4 Drawing Sheets

APPROACHES FOR MIGRATING PORTAL OBJECTS FROM A SOURCE INSTALLATION TO A TARGET INSTALLATION

CLAIM OF PRIORITY

This patent application claims priority from U.S. Provisional Application Ser. No. 60/482,910, entitled "EXTENSIBLE FRAMEWORK IN AN APPLICATION DESIGN TOOL TO MIGRATE CUSTOMIZABLE AND USER-BUILT "APPLICATION COMPONENTS" AND "DESIGN ELEMENTS" FROM ONE INSTALLATION TO ANOTHER," filed Jun. 25, 2003, by Ravishankar Ramanathan, Arun Shivaswamy, and Balakrishnan Jagdeesan, the contents of which are incorporated herein by reference for all purposes.

FIELD OF INVENTION

The invention generally relates to computer systems, and, more specifically, relates to approaches to migrate portal objects from a source installation to a target installation.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art, merely by inclusion in this section.

The creation of software applications is becoming more and more complex. For example, hundreds of software engineers spanning the globe may simultaneously work on the production of a single software application, or may simultaneously work on various related software applications. Additionally, the work on the software application may continue throughout the day and night. For example, engineers in California may work on a certain portion of a software application during a day. At the end of the day, the application may then be e-mailed to another team of engineers working in another country, such as India or Japan, so that another other team of software engineers may continue to work on the application. In this manner, the creation of the software product may continue around the clock.

Additionally, software applications are often created incrementally, and must be moved from one environment to another environment. For example, a software application may need to be moved from a production environment to a testing environment. However, when engineers are scattered across the globe, and production continues around the clock, various challenges arise in maintaining integrity and coalescence among single and multiple applications. For example, metadata may be changed by an engineer working on an application in California, but, if an engineer in India or another country is working on the same application or a related application, metadata in a portal object that is sent from the engineer in California to the engineer abroad may be corrupted or inconsistent.

During software production processes, various installations (e.g., portals) may be involved. In each of the installations, portal objects are created. Portal objects may include application components and/or design elements. The application components used by an application may include, for example, Forms, Reports, Charts, etc. The design elements used by an application may include, for example, Pages (Deciding on the Layout and Regions), Styles, Templates, etc. Portal objects may be migrated for various purposes, such as, for example, moving a portal object to another installation so that another software engineer may alter or test the portal object in an incremental software development and testing environment.

When a portal object is created, metadata concerning the portal object is often stored in a portal table. An installation may have as many as 500 or more tables that comprise the architecture of the software application. The portal tables are used to hold metadata of different kinds of objects. There is often a need to migrate such portal objects from one installation of portal to another installation of portal. For example, if 25 distinct portal objects, each of a different type, need to be migrated to a different portal instance, then a subset of the more than 500 tables, which a user believes may encapsulate the metadata of all twenty-five of the different objects, may be imported or exported. However, complications arise because during the migration, the metadata of objects that already exist on the target portal may be corrupted during the import.

One prior approach to maintaining consistency across applications is versioning. Different versions of the application, including a master version of the application, were maintained. When an engineer completed his or her version of the application, it was copied into the master version. This approach is cumbersome and does not always result in consistent data across applications.

Most of the previously existing approaches for migrating portal objects employ hard-coded and ad-hoc logic to copy metadata from a source portal to target portal. The fact that existing solutions must be hard-coded and prepared in an ad-hoc manner does not allow parallel developments to occur in an efficient fashion. Moreover, as mentioned above, in existing approaches for migrating portal objects, metadata is often corrupted. Hence, there is a need for a framework to be designed in such tools to facilitate the migration of portal objects in a systematic way from a source installation to a target installation.

BRIEF DESCRIPTION OF THE FIGURES

The disclosed subject matter is depicted by way of representative examples, and not by way of limitation, in the illustrations of the accompanying figures. The figures include.

DETAILED DESCRIPTION OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Approaches are disclosed for migrating objects, created for an application by an application design tool, from a source installation to a target installation. The approaches may be used, for example, to migrating any type of portal object from a source installation to a target installation. The portal objects selected to be migrated from a source installation to a target installation may be referred to as the "migrating objects". In an embodiment, a logical container called a "transport set" stores the migrating objects. The metadata of the migrating objects may be stored in infrastructure tables. As shall be described in greater detail hereafter, during the migration, the data in the transport tables (i.e. the application specific data) and the metadata in the infrastructure tables (about the migrating objects) are exported and/or imported to the target installation. In an embodiment, scripts are generated to perform export and/or import functions.

A number of benefits may be realized using the migration techniques described herein. For example, in one embodiment, an infrastructure is provided that facilitates the migration of portal objects among different installations in a manner that provides improved consistency across installations and reduces corruption. Techniques are also provided to migrate portal database providers, page groups, Pages/Portlets, etc. from one installation to another installation. Using the techniques described herein, one may migrate provider registration information for web and database providers whose portlets appear on a page or page group that is being migrated. The techniques allow for the explicit migration of shared objects or shared components.

A technique is provided to selectively mark objects for export and save them to a transport set. The disclosed approaches are also useful in the creation of backups of portal objects or installations.

The foregoing benefits, which derive from certain embodiments, provide an efficient framework for the incremental development of large applications in complex software development environments, including, in particular, staging-to-production development environments that span the globe and feature around-the-clock development by different teams of software engineers.

Functional Overview

A framework is described herein for facilitating the migration of objects of an application, created using an application design tool, from one installation to another. Typically, as the application design tool is used to create objects for an application, the application design tool will store metadata about the objects in system tables, which typically reside within a database system. The migration framework includes a mechanism for maintaining a second set of tables, called transport tables, for holding the relevant metadata of the objects that are to be exported to another installation. According to one embodiment, the transport tables are mirror images of the corresponding dictionary tables of the application design tool.

As shall be described in greater detail hereafter, the framework also includes a logical container called a "Transport Set" to hold the specific objects to be migrated. The framework also provides mechanism, such as a user interface, through which various "Components" that need to be migrated can be identified and added to the transport set. Also, the framework allows different modes of migration, such as "Overwrite", "Reuse", and "Check". Through specifying a mode, the end-users can determine the behavior in the target installation when such components are migrated, and there is a parallel development on the other side.

Approaches are disclosed for migrating portal objects from a source installation to a target installation. In one embodiment, the approaches for migrating portal objects include approaches for migrating customizable and user-built application components and design elements from one installation to another.

According to one embodiment, the migration process involves the creation and maintenance of a set of tables, called transport tables, for holding the metadata to be migrated from one installation to another. Metadata from source installation tables, such as dictionary or system tables, may be stored in the corresponding transport tables (with some preferable extra columns) to facilitate migration to the target installation.

In an embodiment, a logical container called a "transport set" stores the specific portal objects to be migrated. The transport set provides a way through which various portal objects that need to be migrated may be identified. The transport set is stored in infrastructure tables. According to one embodiment, that transport tables are actually mirror tables of the application specific system tables.

By using a transport set, a number of generic notions and modes, such as "Overwrite", "Reuse", and "Check" may be implemented. Using these notions and modes, users may specify allowable or desired data protection modes (e.g., read/write privileges) in the target installation when the migrating objects are migrated. The specified data protection modes dictate how (1) the migrated data and (2) the pre-existing data in the target installation, are reconciled. Based on the data protection modes, data consistency across installations can be maintained.

Several of the migration techniques described herein employ: i. data extraction; ii. script generation; and iii. data merge. The data merge process, in turn, may involve a resolution operation. Each of these steps shall be described in greater detail hereafter.

According to one embodiment, migration begins with a step of selecting portal objects for migration. As mentioned above, each portal object that is selected for transport (each "migrating object") is put into a container object called a transport set.

After the transport set is finalized, the transport set is subject to a data extraction step. In the data extraction step, metadata of the migrating objects is pulled from the portal system tables or dictionary tables and stored in transport tables.

In an embodiment, at the end of the data extraction process, a script is generated for use in the export and/or import of the migrating objects. The script is made available for download. A purpose of this script is to perform validation on the transport set and invoke the export and/or import utilities internally, based on the mode chosen for running the script. The script may be run to generate a dump file for export. In an embodiment, a user may input parameters into the script. The dump file contains, in essence, a dump of the transport set containing portal objects selected for migration.

After the dump file is created, the same script may be run in import mode by specifying the dump file as the input, along with any other parameters used by the script. Execution of the script in import mode migrates the transport set to the target installation.

Even after the import of the migrating objects into the target installation, the migrating objects may still not be ready for use in the target installation, as the migrating objects may not yet be integrated into the system tables or dictionary tables of the target installation.

In another step, the migration may involve a merge operation. In the merge operation, the data residing in the transport tables is transferred to the system or dictionary tables of the target installation. This step may include processes for resolving anomalies in data that resides in the transport set, and/or for improving or ensuring consistency among transport set data and data that is pre-existing in the target installation.

Rather than previous ad-hoc, hard-coded, inconsistent approaches to migrate portal objects among installations, the disclosed approaches provide a systematic and extensible framework to migrate portal objects. In addition to migration, this framework facilitates the backup and recovery mechanisms for various portal objects that may be built by various users at different installations.

The disclosed approaches also allow for parallel development to be performed, improved consistency, and reduced data corruption in across multiple installations, such as the various installations involved in a migration from a staging environment to a production environment.

Portal Implementation Overview

The migration framework described herein may be employed in a portal environment. According to one embodiment, when employed in a portal environment, the framework includes a portal export/import utility maintains transport tables at each portal installation. According to one embodiment, every transport table is an approximate a mirror image of its corresponding portal system table. Every portal object which has been identified for export is put into a container type of object called a transport set.

After the transport set is finalized, the transport set is submitted for the data extraction process. In this step, all the relevant metadata of the portal objects comprising the transport set are pulled from the portal system tables to the respective transport tables. As such, the portal system tables contain metadata of all the objects of portal, and the framework selectively picks metadata of those objects placed in the transport set only.

At the end of the data extraction process, a script is made available for download. In one embodiment, execution of the script performs validations on the transport set and invokes the import and/or export utilities of the database server that manages the tables in question. The import/export utility is invoked internally based on the mode (import or export) chosen for the running the script. To extract the data from the source installation, the script is executed in EXPORT mode to generate a dump of the transport set containing those selected objects chosen for export.

Once the dump has been created, the same script can be executed in IMPORT mode by specifying the dump as the input. Execution of the script in import mode, brings in the transport set to the target portal instance.

To make the portal objects useable at the target portal instance, a merge operation is performed to make the metadata for the transport set an integral part of the target portal's system tables. During the merge operation, the data residing in the transport tables are pushed into system tables of the target portal. After this is done successfully, the migrated objects are available to be viewed and accessed at the target portal installation.

Migration Techniques and Transport Sets

Figure 1:
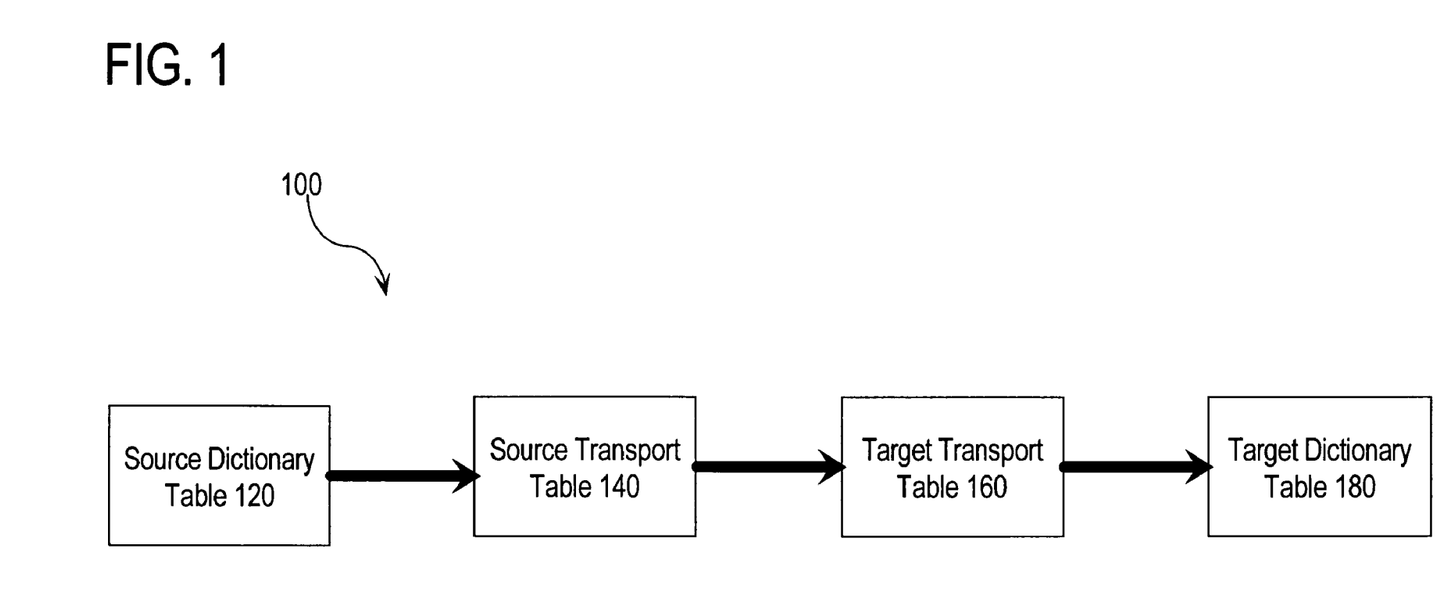
FIG. 1 is a flowchart depicting an embodiment of a method for migrating portal objects from a source installation to a target installation.

FIG. 1 is a block diagram depicting an embodiment of system 100 upon which the migration techniques described herein may be implemented. System 100 includes a source dictionary table 120. Source dictionary table 120 holds the metadata for portal objects in a source installation. A single dictionary table 120 is shown for the purposes of simplicity. However, at the source installation, the metadata for portal objects may be spread across any number of dictionary and/or system tables.

In the illustrated embodiment, system 100 also includes a source transport table 140. In one embodiment, source transport table 140 is a mirror of dictionary table 120, with zero or more additional columns. The metadata of portal objects that are selected for migration to a target installation is extracted from source dictionary table 120 and exported to source transport table 140.

In an embodiment, the metadata stored in source transport table 140 is then migrated to the target installation by importing the metadata from source transport table 140 into target transport table 160. In an embodiment, the transfer of data from source transport table 140 to target transport table 160 is performed though the use of a dump file. Specifically, the import operation is facilitated by generating and running the script to create a dump of source transport table 140. Once the dump is created, the data is imported from the dump into the target transport table 160.

Metadata for the migrating objects may then be imported to target dictionary table 180. A data merge routine may be used to merge the metadata in source transport table 160 with any pre-existing data in target dictionary table 180. Additionally, prior to the data merge, the metadata in target transport table 160 may be examined for anomalies. If anomalies exist, measures may be applied to resolve the anomalies prior to the data merge.

As discussed above, in an embodiment, only one transport set is needed, and can be used to facilitate the migration of any number of migrating portal objects.

Figure 2:
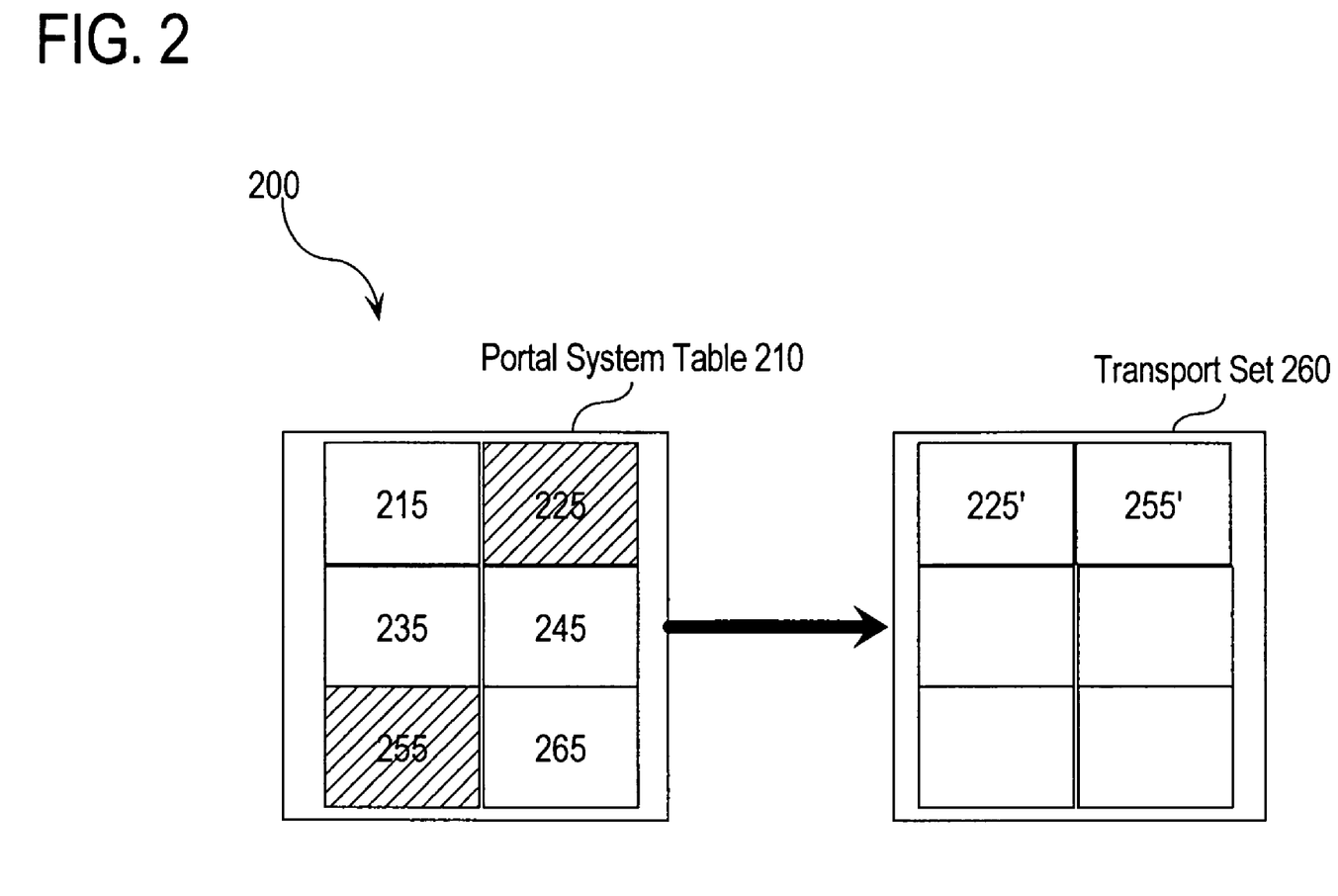
FIG. 2 is a flowchart depicting object selection and metadata extraction from portal system tables into the corresponding transport tables.

FIG. 2 is a block diagram of system 200 depicting portal objects to be transferred from source table 210 in a source installation to a target installation. In the illustrated embodiment, source table 210 is a portal system table, a dictionary table or any other table in a source installation used to store metadata for portal objects in the source installation. For the purpose of explanation, an embodiment is described in which the metadata for a target object resides in a single system table. However, an object may have its metadata stored in more than one system table.

Portal objects may be selected for migration, as described above. In the example shown in system 200, any of portal objects 215-265 may be selected by a user for migration. In the embodiment depicted, the user selects portal objects 225 and 255 for migration to a target installation. Accordingly, portal objects 225' and 255' are stored in transport set 260.

Once the selected migrating objects are stored in transport set 260, portal objects 225' and 255' may be imported into a target installation and merged with any pre-existing data in the target installation.

In an embodiment, implicitly referenced portal objects may also be selected. For example, suppose that a user selects only portal object 225 for export. If, in order to maintain consistency due to codependences, it is also required implicitly that portal object 255 must be exported (due to foreign-key/master-detail/parent-child relationships), then portal object 255 may be implicitly selected for migration.

Exemplary Approaches

According to one embodiment, the migration of portal objects involves several phases, including: i. data extraction; ii. script generation; and iii. data merge. These phases are described in greater detail below.

(i) Data Extraction: Metadata to be migrated is extracted from a selected portal object. In an embodiment, each tool component handles the extraction of data from their dictionary tables and storage in the transport tables. Thus, extensible, the various tool components can extract using their own specific logic/dictionary table structures.

(ii) Script Generation: In script generation, a script is generated for the user to enable extracting this metadata to the OS files. Underneath, the script can make use of RDBMS utilities such as export and import. The user runs the script to store everything onto OS files, and to ultimately move the metadata into the transport tables of the target installation.

(iii) Data Merge: In an embodiment, individual tool components register their own logic for merging the migrated metadata to the target dictionary tables, as appropriate. In this phase, any predefined modes for each and every component being merged could be overridden by users. Prior to the data merge, the metadata in a target transport table may be examined for anomalies. If anomalies exist, measures may be applied to resolve the anomalies prior to the data merge.

Object Selection

Figure 4:
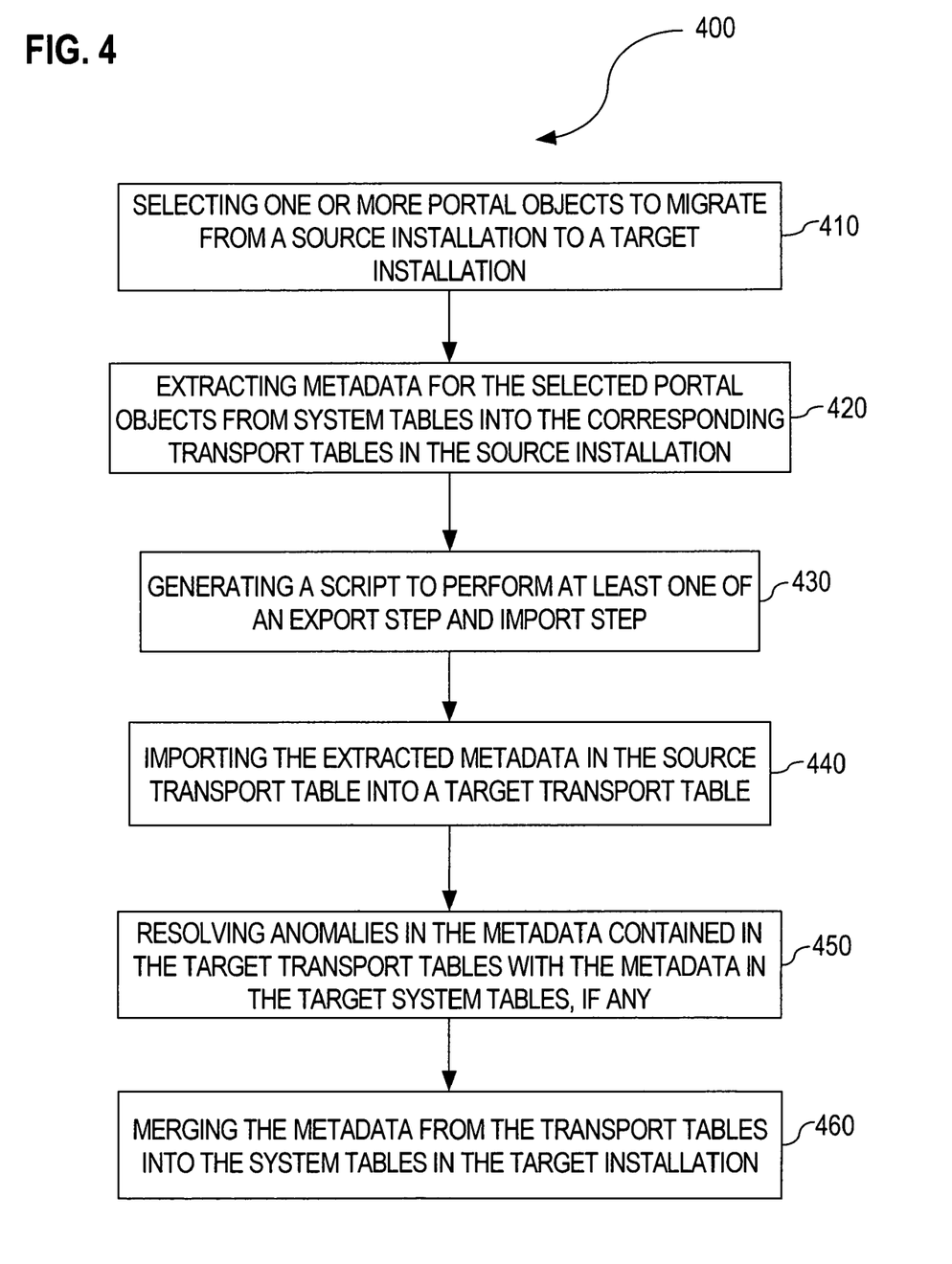
FIG. 4 is a block diagram depicting portal objects to be transferred from a portal system table to a transport table.

FIG. 4 is a flowchart of method 400 for migrating one or more objects from a source installation to a target installation. Step 410 of method 400 involves selecting one or more portal objects to migrate from a source installation to a target installation.

The portal objects may be selected for migration using a graphical user interface displayed on a monitor. In this regard, from a portal navigator or bulk actions screen, a user may click on an "Export" link that is next to a visual representation of a portal object. Clicking the export link that is next to a visual representation of a portal object will select the corresponding portal object for migration. Clicking on the export link may open a transport set user interface to allow a user to create a new transport set or to add the selected portal object(s) to an existing transport set.

The type of objects that may be exported by a user depends on the class of the user. In this regard, different categories of export links will be available to users based on the user's class (e.g., regular user, administrator, etc.). Export links may correspond to specified page groups, page group objects, portal database providers, portal database provider components, or other components. Additionally, if a user has super administrator privileges, the user may click on an export link corresponding to shared portal objects, in an embodiment.

If a user selects the "create new transport set option", the user is presented with other options, such as naming the transport set or choose a default name for the transport set. Next, the user is taken to a manifest screen that displays the manifest for the portal object(s) selected for migration.

In an embodiment, the manifest screen displays an option whereby a user may select the export of object access control lists (ACL). The user may also optionally select preferences for users and groups associated with the ACLs. In addition to the fact that the user may explicitly select portal object(s) for export, other portal objects that the explicit selection references (such as styles, categories, etc.), and external references (such as web and database providers), other page groups and portal database providers, etc., may also be selected. As a default, these options may initially be deselected (e.g., no ACLs or preferences associated with the ACL's will be migrated).

Each representation of an explicit portal object in the transport may be associated with a hyperlink that displays the manifest for the explicit portal object. Therefore, if two portal objects are added to the transport set, the references for each portal object may be independently identified using the hyperlink for that portal object.

The transport set could then be saved for export at a later time, or the transport set may be processed immediately.

As stated above, step 410 optionally comprises adding an object to an existing transport set. If this is the case, then the user selects to add an object to an existing transport set, rather than creating a new transport set and adding the object to the new transport set.

The creation of the transport set (e.g., the transport tables) and the addition of objects to the transport set is facilitated by functions in an application layer, which in turn perform all the database related operations through a database layer.

Tables Used in Migration

Various tables are used in implementing migration techniques that use transport sets. According to one embodiment, a master table stores: metadata about a transport set, data that indicates whether to export object ACLs, data that indicates preferences for users/groups in ACLs, and data that indicates default options for import including whether to ignore warnings. A detail table stores information about explicit and implicit portal object selections and external references. The detail table also stores information about the mode of import for explicit and implicit portal objects.

Metadata Extraction

Method 400 also includes step 420. Step 420 includes extracting metadata about the selected portal objects from system tables into the corresponding transport tables in the source installation. In one embodiment, in step 420, extraction from the selected portal objects is initiated. Then, in step 330, the export-import infrastructure of the application initiates calls to sub-system export packages through standard routines that perform exports of data from selected portal objects.

In an embodiment, during step 420, a link is provided from the export-import user interface that allows the user to see the log of actions being performed. Additionally, the user interface allows a user to download specific scripts for transport functions that may be used in command lines to create a dump file for the transport set.

A number of tables are employed to implement steps 420 and 330. Specifically, as mentioned above, a master table stores: metadata regarding the transport set, data that indicates whether to export object ACLs, preferences for users/groups in ACLs, and default options for import, including whether to ignore warnings. A detail table stores information concerning explicit and implicit object selections and external references, mode of import for explicit and implicit object selects which are overwrite and reuse by default respectively, etc. A log table stores information about what happened to each migrating object, etc.

According to an embodiment, every system table that comprises the application being developed has a corresponding mirror table, called transport table. The transport tables may include some extra columns that are not included in the corresponding system table. These columns could typically store unique Ids to identify the transport sets and store the import mode of each migrating object.

Script Generation

Referring again to FIG. 4, at step 430 a script is generated which, when executed, will perform at least one of the aforementioned export steps and import steps. The user may invoke the script from command line, pass values to the parameters of the script, and create a dump file for the uniquely identified transport set.

The Windows NT and UNIX version of the script is generated by procedure(s) in a user interface package that embed a unique identifier for the transport set. The script invokes the Oracle Database's Export utility that exports the content of the transport tables (and the export-import utility tables) selectively. The script is common for both export and import, the parameters passed during invocation of the script and the values provided determine whether the operation is an export or import.

Various tables are involved in the implementation of step 430. For example, a master table stores metadata about transport set, whether to export object ACL's, preferences for users/groups in ACL's, default options for import including whether to ignore warnings. A detail table stores information about explicit and implicit object selections and external references, mode of import for explicit and implicit object selects which are overwrite and reuse by default respectively, etc. Various sub-system transport tables are also employed in step 430.

Importing the Extracted Metadata

Method 400 includes step 440. Step 440 includes importing extracted metadata in the source transport table to a target transport table (i.e., to a transport table associated with the target installation.)

In an embodiment, if the metadata resides in a dump file created from the source transport tables, then the importing step may include invoking a script to move the contents of dump file(s) to the target transport tables.

Various packages are employed in the implementation of step 440. The Windows NT and UNIX version of the script is generated by procedure(s) in a computer's user interface package and establishes a unique identifier for the transport set. This script is used during export to extract the contents from transport tables to dump file. The same script may used here to import the contents from dump file to transport tables.

In an embodiment, the script invokes the Oracle Database's Import utility that exports the content of the transport tables (and the export-import utility tables) selectively. As mentioned above, the script may be common for both export and import. The parameters passed during invocation of the script, and the values provided, determine whether the operation is an import or export.

A number of tables are employed in the implementation of step 440. For example, as mentioned above, the master table stores metadata regarding a transport set. The master table also indicates whether to export object ACLs, indicates preferences for users/groups in ACL's, and indicates default options for import including whether to ignore warnings.

A detail table stores information about explicit and implicit portal object selections and external references. The detail table also indicates modes of import for explicit and implicit portal object selections. Examples of modes of import include "overwrite" and "reuse", among others. Various subsystem transport tables are also employed.

Resolving Anamolies

Method 400 also includes step 450. Step 450 involves resolving anomalies in metadata of the target transport tables and target system tables. Resolving anomalies may include examining the metadata in objects and then correcting inconsistencies between the metadata in objects and metadata stored in files or other tables.

A call to start import for each sub-system will transfer control over to the sub-system which will then, resolve and merge data from transport tables to system tables, log information, and pass back control to export-import utility upon completion. A link may be provided from the export-import user interface that allows the user to see the log of actions being currently performed.

Step 450 may be initiated and performed at various points in method 400. In this regard, step 450 may be applied in respect of metadata in a transport set associated with a source installation and/or a transport set associated with a target installation. Step 450 may be applied at multiple instances in respect of each transport set, or it may be applied once in respect of a various transport sets (e.g., in respect of multiple transport sets in a single installation, or in respect of transport sets for different installations.)

In an embodiment, step 450 is performed prior to merging data from a transport table associated with a target installation into the system or dictionary tables of the target installation.

Merging the Metadata

Method 400 also includes step 460. Step 460 involves merging metadata from the target transport tables into system tables or other tables in the target installation. For example, step 460 may include merging metadata from a target transport table into a system table or dictionary table in the target installation.

In order to move the portal object data into tables in the target installation, an import may be performed, or other methods for merging the metadata may be used. In this regard, a procedure may be executed that initiates the merge step(s). Then, export-import functions may call sub-system import packages through standard routines that perform exports in their respective area.

Various packages are employed in the implementation of step 460. For example, changes to the transport set, such as modifying the import options, etc., are facilitated through functions in an application layer, which in turn perform all the database related operations through database layer. Various functions determine dependencies among objects to be exported and/or imported (due to foreign-key/master-detail/parent-child relationships).

A number of tables are involved in the implementation of the step 460. For example, a master table stores metadata about transport set. A master table also indicates whether object ACLs have been exported and need to be imported, indicates preferences for users/groups in ACL's, and indicates default options for import including whether to ignore warnings. A detail table stores information about explicit and implicit object selections and external references, and indicates the mode of import for explicit and implicit portal objects.

A log table stores information about what happenned to each object being exported/imported, etc. as well as other pertinent data. Every system table that comprise the application being developed would have a corresponding mirror table called transport table, may be with some extra columns. These columns could typically store unique Ids to identify the transport sets and store the import mode of each object being imported.

In an embodiment, a mapping table stores the target mapping for a portal object. While merging data from the transport tables to the target tables in the target installation, a data resolution step may be implemented. Data resolution may be useful in a number of situations. For example, an object might not exist in the target installation. In this case, a new name (e.g., identity) is generated for the portal object, and an entry is made in the mapping table for the portal object to reflect the old name that was associated with the portal object in the source installation. If the object already exists in the target installation, then an entry is made to match the target installation's name to the source object in the source installation.

The information in the mapping table may be used to propagate the name changes to a portal object among related portal objects. For example, a change in the identity of a category of data items may be propagated to all the tables which reference the category (e.g., pages, items, etc.). In this regard, method 400 may include a step of propagation.

Migration of Implicitly Selected Portal Objects

According to one embodiment, mechanisms are provided for migrating implicitly selected portal objects during the migration process. For example, in an embodiment, a manifest screen is provided for the transport set. The manifest screen displays the explicitly selected object(s), implicit references, and external references. In an embodiment, a detail screen is provided for each explicitly selected portal object that displays the children, implicit references and external references for the explicitly selected portal object. Additionally, the external references may be moved to the explicit objects list. What kind of objects fall under Explicit/Referenced/External are left to the end users to identify and implement accordingly.

According to one embodiment, a mechanism is provided to allow the mode of import to be set for the explicit and implicit objects in transport set. In an embodiment, the approaches allow the export of access control lists (ACL's) for the objects in the transport set. Also, the transport set provides a mechanism for the export of users and groups preferences when object ACLs are selected for export. In an embodiment, the approaches also provide a method of viewing the log of actions being performed. Downloadable links to transport set-specific export-import scripts for Windows NT and UNIX may also be provided.

Hardware Overview

The approach for reconfiguring nodes described herein may be implemented in a variety of ways and the invention is not limited to any particular implementation. The approach may be integrated into a computer system or a network device, or may be implemented as a stand-alone mechanism. Furthermore, the approach may be implemented in computer software, hardware, or a combination thereof.

Figure 3:
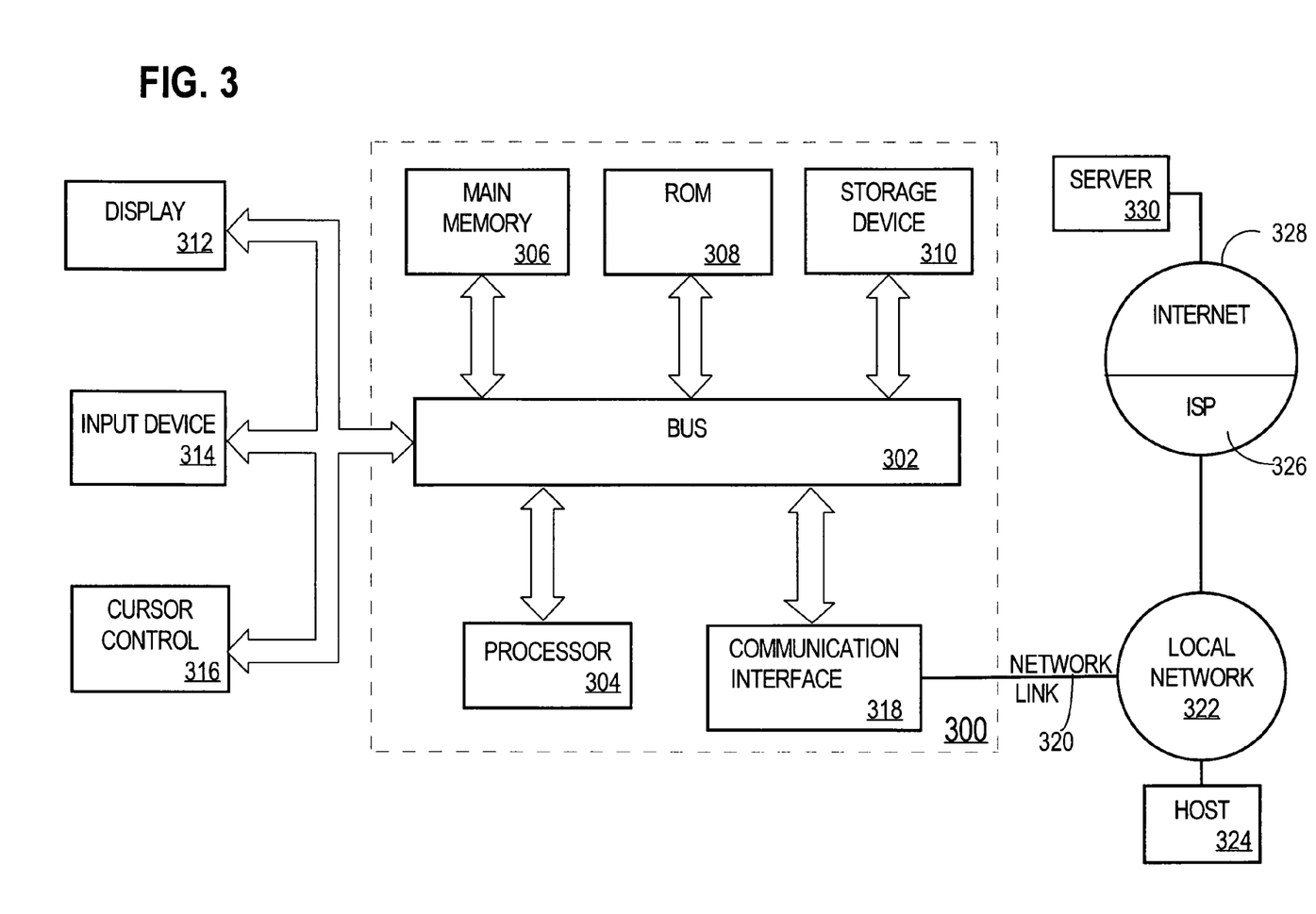
FIG. 3 is a block diagram depicting a system upon which embodiments of the disclosed approaches may be implemented.

FIG. 3 is a block diagram that depicts a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of migrating objects from a source installation to a target installation, comprising:

receiving input that selects a set of migrating objects, wherein the set of migrating objects is a set of objects at the source installation that are to be migrated to the target installation;

from a first set of one or more system tables at the source installation, copying metadata that defines the selected set of migrating objects into a first set of transport tables at the source installation;

exporting the metadata from the first set of transport tables at the source installation;

importing the metadata that was exported from the first set of transport tables into a second set of transport tables at the target installation site;

merging the metadata from the second set of transport tables into a second set of one or more system tables at the target installation, wherein merging the metadata comprises transferring at least a portion of the metadata from the second set of transport tables into the second set of one or more system tables; and migrating the set of migrating objects into the target installation.

2. The method of claim 1, wherein:

the step of exporting includes creating a dump file by invoking an export utility of a database server that manages a database containing the first set of system tables; and the step of importing includes copying data from the dump file into the section set of system tables by invoking an import utility of a database server that manages a database containing the second set of system tables.

3. The method of claim 1, further comprising generating a script file which, when executed in a first mode causes performance of the step of exporting, and when executed in a second mode causes performance of the step of importing.

4. The method of claim 1, wherein:

the objects are application components created for an application by an application design tool associated with the first installation; and after the step merging, accessing the application components using an application design tool associated with the second installation.

5. The method of claim 1 wherein the first set of transport tables are mirrors of the first set of system tables, and include one or more columns in addition to the columns of the first set of system tables.

6. The method of claim 1 wherein the second set of transport tables are mirrors of the second set of system tables, and include one or more columns in addition to the columns of the second set of system tables.

7. The method of claim 1 wherein the step of merging includes resolving inconsistencies between metadata being copied into the second set of system tables from the second set of transport tables, and metadata that already exists in said second set of system tables.

8. The method of claim 1 wherein:

one or more objects in the set of migrating objects have dependencies relative to a set of one or more other objects that have not been selected by the input;

the method further comprises the steps of automatically identifying the set of one or more other objects upon which the migrating objects depend; and migrating from the first installation to the second installation the set of other objects along with the set of migrating objects.

9. The method of claim 1, wherein the one or more system tables at the source installation comprise metadata pertaining to the set of migrating objects, wherein the set of migrating objects were created by an application design tool.

10. The method of claim 1, further comprising merging the set of migrating objects with pre-existing data in the target installation in accordance with a specified mode that dictates how the set of migrating objects and the pre-existing data are to be reconciled.

11. A computer-readable storage medium carrying one or more sequences of instructions which, when executed by one or more processors, causes the one or more processors to perform the steps of: receiving input that selects a set of migrating objects, wherein the set of migrating objects is a set of objects at the source installation that are to be migrated to the target installation;
from a first set of one or more system tables at the source installation, copying metadata that defines the selected set of migrating objects into a first set of transport tables at the source installation;
exporting the metadata from the first set of transport tables at the source installation;
importing the metadata that was exported from the first set of transport tables into a second set of transport tables at the target installation site;
merging the metadata from the second set of transport tables into a second set of one or more system tables at the target installation, wherein merging the metadata comprises transferring at least a portion of the metadata from the second set of transport tables into the second set of one or more system tables; and
migrating the set of migrating objects into the target installation.

12. A computer-readable storage medium as recited in claim 11, wherein
the instructions which, when executed by one or more processors, causes the one or more processors to perform the step of exporting include one or more sequences of instructions which, when executed by the one or more processors, causes the one or more processors to perform the step of creating a dump file by invoking an export utility of a database server that manages a database containing the first set of system tables; and
the instructions which, when executed by the one or more processors, cause the one or more processors to perform step of importing include one or more sequences of instructions which, when executed by the one or more processors, causes the one or more processors to perform step of copying data from the dump file into the section set of system tables by invoking an import utility of a database server that manages a database containing the second set of system tables.

13. A computer-readable storage medium as recited in claim 11, wherein the instructions which, when executed by one or more processors, cause the one or more processors to perform the steps of generating a script file which, when executed in a first mode causes performance of the step of exporting, and when executed in a second mode causes performance of the step of importing.

14. A computer-readable storage medium as recited in claim 11, wherein the objects are application components created for an application by an application design tool associated with the first installation; and wherein the instructions which, when executed by one or more processors, cause the one or more processors to perform, after the step merging, the step of, accessing the application components using an application design tool associated with the second installation.

15. A computer-readable storage medium as recited in claim 11, wherein the first set of transport tables are mirrors of the first set of system tables, and include one or more columns in addition to the columns of the first set of system table.

16. A computer-readable storage medium as recited in claim 11, wherein the second set of transport tables are mirrors of the second set of system tables, and include one or more columns in addition to the columns of the second set of system tables.

17. A computer-readable storage medium as recited in claim 11, wherein the instructions which, when executed by one or more processors, cause the one or more processors to perform the step of merging include one or more sequences of instructions which, when executed by one or more processors, causes the one or more processors to perform the step of resolving inconsistencies between:
metadata being copied into the second set of system tables from the second set of transport tables, and
metadata that already exists in said second set of system tables.

18. A computer-readable storage medium as recited in claim 11, wherein one or more objects in the set of migrating objects have dependencies relative to a set of one or more other objects that have not been selected by the input; and
carrying one or more further sequences of instructions which, when executed by the one or more processors, causes the one or more processors to perform the step of automatically
identifying the set of one or more other objects upon which the migrating objects depend; and
migrating from the first installation to the second installation the set of other objects along with the set of migrating objects.

19. A computer-readable storage medium as recited in claim 11, wherein the one or more system tables at the source installation comprise metadata pertaining to the set of migrating objects, wherein the set of migrating objects were created by an application design tool.

20. A computer-readable storage medium as recited in claim 11, carrying one or more further sequences of instructions which, when executed by the one or more processors, causes the one or more processors to perform the step of merging the set of migrating objects with pre-existing data in the target installation in accordance with a specified mode that dictates how the set of migrating objects and the pre-existing data are to be reconciled.

* * * * *

UNITED STATES PATENT AND TRADEMARK OFFICE
CERTIFICATE OF CORRECTION

PATENT NO. : 7,346,627 B2
APPLICATION NO. : 10/789838
DATED : March 18, 2008
INVENTOR(S) : Ramanathan et al.

It is certified that error appears in the above-identified patent and that said Letters Patent is hereby corrected as shown below:

On Title page, in Item (56), in column 2, under "Other Publications", line 4, delete "Protal" and insert -- Portal --, therefor.

In column 3, line 7, delete "to" and insert -- for --, therefor.

In column 10, line 5, delete "Anamolies" and insert -- Anomalies --, therefor.

In column 11, line 1, delete "happenned" and insert -- happened --, therefor.

Signed and Sealed this

Twenty-seventh Day of October, 2009

David J. Kappos
*Director of the United States Patent and Trademark Office*